(12) United States Patent
Lam

(10) Patent No.: US 7,904,083 B2
(45) Date of Patent: Mar. 8, 2011

(54) METHOD AND APPARATUS FOR EFFICIENT NETWORK SCANNING

(75) Inventor: Yiu Ming Lam, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 551 days.

(21) Appl. No.: 10/949,299

(22) Filed: Sep. 27, 2004

(65) Prior Publication Data
US 2006/0068781 A1 Mar. 30, 2006

(51) Int. Cl.
*H04W 4/00* (2009.01)
(52) U.S. Cl. .................. 455/434; 455/435.2; 455/435.3; 455/453; 455/403
(58) Field of Classification Search ............... 455/161.1, 455/432.1, 436, 62, 432.3, 403, 422.1, 422, 455/432, 433, 67.11, 435
See application file for complete search history.

(56) References Cited

U.S. PATENT DOCUMENTS

| | | | |
|---|---|---|---|
| 6,229,996 B1 | 5/2001 | Uistola | |
| 6,259,917 B1 * | 7/2001 | Elzein | 455/435.2 |
| 6,377,787 B1 * | 4/2002 | Bamburak et al. | 455/161.1 |
| 6,421,328 B1 * | 7/2002 | Larribeau et al. | 370/329 |
| 6,615,043 B1 | 9/2003 | van de Berg | |
| 6,941,135 B2 * | 9/2005 | Minear et al. | 455/419 |
| 6,992,997 B1 * | 1/2006 | Refai et al. | 370/329 |
| 7,167,707 B1 * | 1/2007 | Gazzard et al. | 455/434 |
| 2002/0019231 A1 * | 2/2002 | Palenius et al. | 455/437 |
| 2003/0060189 A1 * | 3/2003 | Minear et al. | 455/411 |
| 2004/0203838 A1 * | 10/2004 | Joshi et al. | 455/455 |
| 2005/0064869 A1 * | 3/2005 | Ansorge | 455/435.2 |
| 2006/0078073 A1 * | 4/2006 | Simmons | 375/336 |

FOREIGN PATENT DOCUMENTS

| WO | WO03/053086 | 6/2003 |
|---|---|---|
| WO | WO 03/053086 A1 * | 6/2003 |

* cited by examiner

*Primary Examiner* — Huy Phan
(74) *Attorney, Agent, or Firm* — Ridout & Maybee LLP

(57) ABSTRACT

A method and apparatus for efficient network scanning that selects candidate frequencies based upon the frequency bands that were noted as being active during a previous network scan. A mobile device performs a full network scan on power up or on radio cycle and determines the available active bands. This information is stored as active band information on the device. When the device loses coverage on a selected one of the bands, then it identifies a candidate frequency based upon the stored active band information and attempts to locate a suitable network on the candidate band.

18 Claims, 2 Drawing Sheets

METHOD AND APPARATUS FOR EFFICIENT NETWORK SCANNING

FIELD OF TECHNOLOGY

The present application relates to wireless mobile devices and, in particular, to frequency band scanning to locate a suitable network for wireless communication.

BACKGROUND INFORMATION

Many wireless devices are capable of communicating with wireless networks on more than one frequency band. Wireless networks in different countries or regions often have different frequency bands available for wireless communication services. In particular, North American systems typically have 850 MHz band and/or 1900 MHz band and European systems typically have 900 MHz band and/or 1800 MHz band. Devices that are capable of communicating on more than one frequency band require a mechanism and method for scanning supported frequency bands and selecting a suitable network.

One option is to perform an exhaustive network scan to search for suitable networks on all frequency bands supported by the device. This process is typically performed by many wireless devices upon power cycle and/or radio cycle; however scanning all frequency bands exhaustively is expensive in terms of battery power. A device sometime loses coverage on one frequency band and needs to re-establish a connection with a wireless network as quickly and efficiently as possible. In these circumstances, an exhaustive network scan consumes time and battery power.

Accordingly, some devices base their search for active frequency bands upon the country in which the device was most recently connected. For example, if the device had established communications on a 900 MHz band, it may choose to assume it is located in a country supporting the European network frequency plan. Therefore, it may assume that the frequency bands that will be available are the usual 900 MHz and/or 1800 MHz bands. Thus, the device may limit its search for suitable networks to these two likely co-existing frequency bands, if these two bands are supported by the device.

There are some circumstances in which this technique fails to locate the available networks unless a power cycle or radio cycle is performed. In some countries or regions suitable networks may be available on frequency bands associated with both network frequency plans. For example, in the border regions of some countries a device may be capable of connecting to wireless providers in either of two countries, each of which may be on a different network frequency plan. Therefore, the device may have available to it suitable networks providing, for example, 850 MHz, 900 MHz, and 1800 MHz bands. It would be advantageous to have a method and system for efficiently locating suitable networks on available supported frequency bands in such a situation.

BRIEF SUMMARY

The present application describes a method and apparatus for efficient network scanning that searches for suitable networks based upon the frequency bands that were noted as being active during a previous network scan. A mobile device performs a full network scan on power up or on radio cycle and determines which of the frequency bands supported by the device are active. This information is stored as active band information on the device. When the device loses signal coverage, it scans for suitable networks beginning with the bands included in the stored active band information.

In one aspect, the present application provides a method of efficient frequency band scanning of multiple supported bands to obtain service for a mobile device. The mobile device includes a stored list of frequency bands identified as being active during a previous scan. The mobile device communicates on a current band. The method includes the steps of selecting a candidate band from the stored list of bands in response to a loss of coverage on the current band, and scanning the candidate band to locate a wireless network and, if the wireless network is located, obtaining service on the candidate band.

In another aspect, the present application provides a mobile electronic device. The mobile electronic device includes a communications subsystem for engaging in wireless communication with a wireless network, the communications subsystem being capable of communicating on at least two frequency bands, including a current band. The device also includes memory and a processor connected to the memory and to the communications subsystem for controlling operation of the communications subsystem. The device also includes a list stored in the memory, wherein the list contains frequency bands identified as being active during a previous scan, and a network locator component. The network locator component selects a candidate band from the list in response to a loss of coverage on the current band, scans the candidate band to locate the wireless network and, if the wireless network is located, obtains service on the candidate band.

Other aspects and features of the present application will become apparent to those of ordinary skill in the art upon review of the following description of specific embodiments in conjunctions with the accompanying figures.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION

Figure 1:
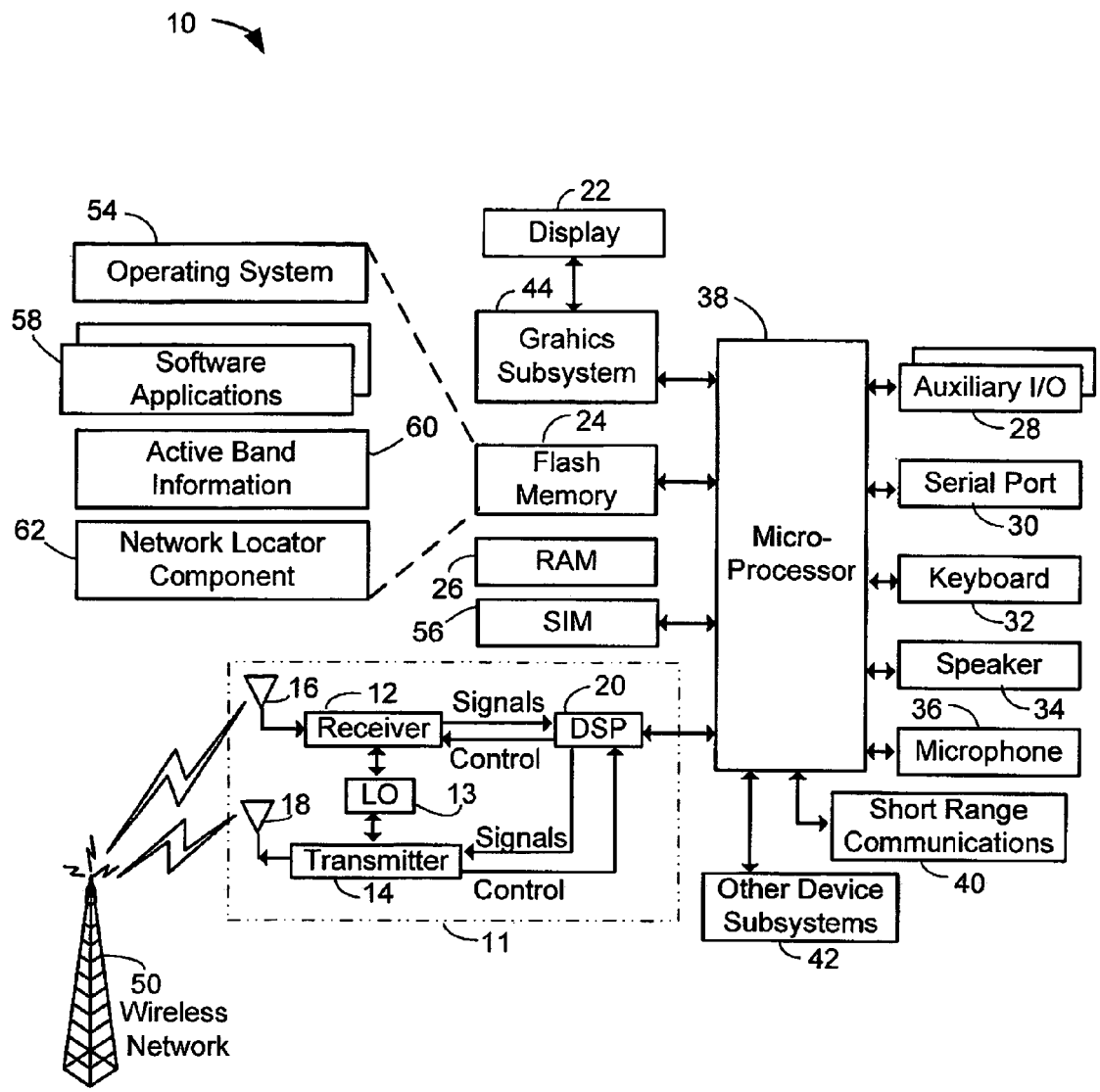
FIG. 1 shows a block diagram of a mobile electronic device.

Referring first to FIG. 1, there is a block diagram of a mobile electronic device 10 to which example embodiments of the present application may be applied. The mobile electronic device 10 communicates with a wireless network 50.

In the embodiment of FIG. 1, the mobile electronic device 10 is a hand-held two-way mobile communication device 10 capable of obtaining at least one service from the wireless network 50. In an example embodiment, the device has the capability to communicate with other computer systems on the Internet. In various embodiments, mobile electronic devices 10 includes data communication devices, multiple-mode communication devices configured for both data and voice communication, mobile telephones, mobile communication devices, PDAs enabled for wireless communications, 1-way or 2-way pagers, wireless modems operating in conjunction with computer systems, and any type of mobile wireless communication devices. In the presently described embodiment, each of the mobile electronic devices 10 is configured to operate within the wireless network 50. It should be appreciated however that the present application is in no way limited to these example types of devices and may be implemented in other wireless devices.

The device 10 includes a microprocessor 38 and a communication subsystem 11. The communication subsystem 11 includes a receiver 12, a transmitter 14, and associated components such as one or more, preferably embedded or internal, antenna elements 16 and 18, and a processing module such as a digital signal processor (DSP) 20. In some embodiments, the communication subsystem 11 includes local oscillator(s) (LO) 13, and in some embodiments the communication subsystem 11 and microprocessor 38 share an oscillator. As will be apparent to those skilled in the field of communications, the particular design of the communication subsystem 11 will be dependent upon the communication network in which the device 10 is intended to operate.

Signals received by the antenna 16 through the wireless communication network 50 are input to the receiver 12, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP 20 and input to the transmitter 14 for digital to analog conversion, frequency up conversion, filtering, amplification and transmission over the wireless communications network 50 via the antenna 18.

The microprocessor 38 controls the overall operation of the device 10. The microprocessor 38 interacts with communications subsystem 11 and also interacts with further device subsystems such as a display 22, flash memory 24, random access memory (RAM) 26, auxiliary input/output (I/O) subsystems 28 (which may include a thumb-wheel, for example), serial port 30, keyboard or keypad 32, speaker 34, microphone 36, a short-range communications subsystem 40, a graphics subsystem 44, and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

The device 10 also includes a security identity module (SIM) 56, or SIM card. The SIM 56 comprises a memory or storage element containing wireless communications related data. For example, in some embodiments, the SIM 56 stores phone numbers, contact names and other data entered by the user. The SIM 56 may also store the identity of a registered public land mobile network (RPLMN). The RPLMN identifies the wireless network 50 (i.e. a PLMN) to which the device 10 was most recently successfully connected to obtain services. RPMLN includes a Mobile Country Code (MCC) and a Mobile Network Code (MNC). The MCC identifies the country in which the mobile device 10 is or was located when it last connected to the wireless provider.

Operating system software 54 and various software applications 58 used by the microprocessor 38 are, in one example embodiment, stored in a persistent store such as flash memory 24 or similar storage element. Software applications 58 may include a wide range of applications, including an address book application, a messaging application, a calendar application, and/or a notepad application. Those skilled in the art will appreciate that the operating system 54, specific device applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device. A predetermined set of applications 58 which control basic device operations, including at least data and voice communication applications for example, will normally be installed on the device 10 during manufacture. Further applications may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

The device 10 further includes a network locator component 62. The network locator component 62 manipulates and controls the communication subsystem 11 for the purpose of locating service on the wireless network 50. Although the network locator component 62 is shown as being resident in flash memory 24, those skilled in the art will appreciate that it may be stored elsewhere, including in RAM 26, in the SIM 56 or within the communication subsystem 11 itself.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over the wireless communication network 50 through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through the wireless communication network 50.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

Wireless network 50 is, in an example embodiment, a wireless packet data network, (e.g. Mobitex™ or DataTAC™), which provides radio coverage to mobile electronic devices 10, although it could be any other types of wireless network. The wireless network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

In general, the device 10 may support more than one frequency band for wireless communications. Such bands are referred to herein as "supported bands". Two frequency bands that are predominantly used in North America are 850 MHz and 1900 MHz frequency bands. Elsewhere in the world, and in particular in Europe, 900 MHz and 1800 MHz are the two bands primarily in use. A mobile device may be designed to support multiple frequency bands, including bands in both the European and North American frequency plans. For example, a wireless device may be designed to communicate on 900 MHz, 1800 MHz, and 1900 MHz bands. When outside of North America, such a device must select between 900 MHz and 1800 MHz bands, whereas inside of North America, the device operates upon the 1900 MHz band.

In some cases, such a device may be located in a country or region where both North American and European (World) bands are available. In these circumstances, all supported frequency bands may be available to the device.

In the present embodiment, the device 10 includes active band information 60. The active band information 60 may be stored in the flash memory 24, or in any other memory element. The active band information 60 comprises information regarding the active frequency bands located during the most recent full network scan performed by the device 10. The active band information 60 is updated by the device 10 whenever a band is scanned to see if it is active, i.e. to see if there is an available network.

When the device 10 is powered on, or otherwise undergoes a power cycle or radio cycle, the device 10, under the control of the network locator component 62, performs a full network scan, scanning all the frequency bands that it supports to select an RPMLN or equivalent PLMN (if it is available). If necessary, it attempts to perform a location registration. The full network scan involves scanning all of the bands supported by the device to attempt to identify active frequency bands upon which the device 10 could obtain wireless services. Once the device 10 has successfully registered with a network, it stores the RPLMN in its SIM 56. For example, the device 10 may find a network at 900 MHz. It may register with the network and store the corresponding network identity as RPLMN and engage in communications on the 900 MHz band.

In addition, the network locator component 62 stores the information gathered during the network scan as the active band information 60. For example, the device 10 may have determined that active frequency bands include 900 MHz and 1900 MHz. The active band information 60 reflects these findings.

At some later point, the device 10 may lose coverage on its selected active band, and in response it attempts to re-establish contact with a network. If a RPLMN is available on the device 10, the network locator component 62 is aware that the device 10 was most recently connected to a provider in a particular country based upon stored country information, which in one embodiment is found in the MCC part of the RPLMN. Using the MCC, the network locator component 62 is able to determine whether or not it was in a country affiliated with the North American plan for mobile device frequencies (i.e. 850 MHz and 1900 MHz) or the European plan for mobile device frequencies (i.e. 900 MHz and 1800 MHz). Prior art devices base their attempts to re-locate coverage solely upon the likely co-existing bands as indicated by the MCC of the RPLMN, if available. In other words, if the device was most recently connected to a provider in a country affiliated with the European plan on a 900 MHz band, then the device would only seek to attain coverage on the 1800 MHz frequency band, if supported by the device 10.

The device 10 shown in FIG. 1 includes the active band information 60, which informs the device 10 as to the active frequency bands that were noted during the most recent network scan. The network locator component 62 uses the active band information 60 to determine where to look for reconnection to the wireless network 50 when it loses coverage on its first selected band. The active band information 60 provides the network locator component 62 with promising candidate frequencies. Since these frequencies were recently noted as active, the network locator component 62 presumes that they may still be available and attempts to determine if they are still active. If one of the active bands in the list is also a likely co-existing band, i.e. it is on the same network frequency plan as the first selected band, then the device 10 will begin to look for coverage on the likely co-existing band. As an example, if the active band information 60 indicates that the 900 MHz and 1900 MHz bands were active, and the device 10 just lost coverage on 900 MHz, then rather than checking 1800 MHz, which is the European plan pair frequency to 900 MHz, the device 10 first scans the 1900 MHz band to see if it can select a network to obtain service.

If the device 10 exhausts the candidate bands listed in the active band information 60 without obtaining service from a network successfully, then it may utilize the MCC in the RPLMN information to identify a further candidate band, which would be the likely co-existing band based on the network frequency plan if that likely co-existing band was not already included in the active band information 60.

In the event that none of the bands in the active band information 60 are still active and the likely co-existing band is not active, then the device 10 may continue to scan for any other supported and unscanned bands to attempt to locate a suitable network.

Figure 2:
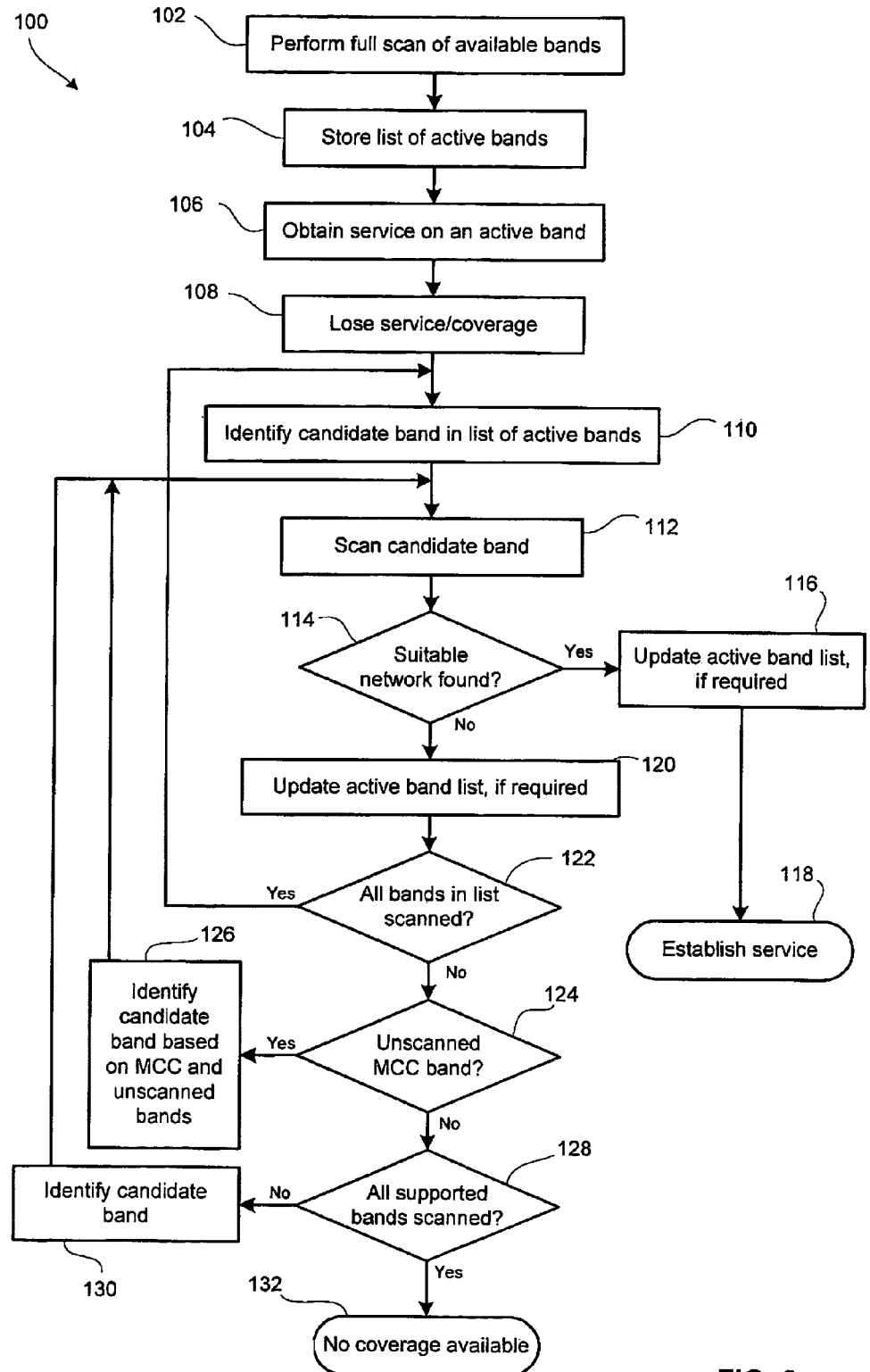
FIG. 2 shows, in flowchart form, a method of efficient network scanning to locate service.

Reference is now made to FIG. 2, which shows, in flowchart form, a method 100 of efficient network scanning to locate service. The method 100 begins in step 102, wherein a mobile wireless device performs a full scan for a suitable network. In step 104, the mobile wireless device stores a list of active bands as active band information. The list may be stored in any suitable manner in a memory element associated with the mobile wireless device. The list is populated with the active bands located during the scan performed in step 102.

The wireless device obtains service on a selected one of the active bands in step 106. This may include registering the wireless device with the network provider and storing the identity as the RPLMN of the network provider.

In step 108, coverage on the selected active band is lost. As a result, in step 110 the wireless device identifies a candidate band from the list of active bands stored as active band information. The candidate band may or may not be the corresponding band from the same frequency plan as the selected active band, i.e. the likely co-existing band. For example, if the selected active band was 1900 MHz, the candidate band is not necessarily 850 MHz (the other North American plan frequency), but may be 900 MHz or 1800 MHz if supported. However, in one embodiment, if the list of active bands includes the likely co-existing band, then the device selects this as the first candidate band.

In step 112, the wireless device scans the candidate band in an attempt to locate a suitable network. In step 114, the device evaluates whether or not a suitable network was located during the scan in step 112. If a suitable network is located on the candidate band, then the wireless device updates the active band information in step 116 and obtains service in step 118. If a suitable network is not available on the candidate band, then in step 120 the device updates the active band information. In step 122, the device assesses whether any additional unscanned bands remain in the list of active bands, i.e. if there are any more candidate bands in the active band information. If there are other candidate frequency bands, then the method 100 returns to step 110 wherein the device attempts to identify another candidate band in the list of active bands.

If the device exhausts the list of active bands without locating a suitable network, then it proceeds to step 124 wherein it determines whether or not it has already scanned for a likely co-existing band. Based on the country information (i.e. MCC) in the RPLMN stored in the device, it may identify the likely co-existing band related to the band on which the device has lost coverage. Provided that the device supports the likely co-existing band, it may be able to locate a suitable network on this band even though it was not previously noted as being active. If the device has not already scanned this band in step 112—in other words, if the likely co-existing band was not included in the list of active bands—then the method 100 proceeds to step 126, wherein the likely co-existing band is identified as a candidate band. From there the method 100 returns to step 112 to scan the likely co-existing band. By way of example, suppose that a device supports the 850 MHz, 900 MHz, and 1900 MHz bands, and lost coverage on the 850 MHz band. The active band information may direct the device to scan the 900 MHz band. If service is not located on this band, then the device would determine in step 124 that it has not scanned the likely co-existing band, namely 1900 MHz. Accordingly, the device would next scan the 1900 MHz band.

If the device does not support the likely co-existing band, or if it has been scanned already, then the method 100 proceeds to step 128, wherein the device assesses whether there are any other supported bands that have not been scanned. If so, then in step 130 an unscanned supported band is identified as a candidate band and the method 100 returns to step 112 to scan the candidate band.

If the device scans all its supported bands without locating a suitable network, then the method ends at step 132 with the conclusion that service is unavailable. At this stage the device has essentially performed a full network scan for coverage. If no network is available, then the device would perform a full network scan at the next appropriate time such as when a timer expires to scan for network again.

Those of ordinary skill in the art will appreciate that the foregoing steps and functions attributed as being performed by the device may be performed by a microprocessor, microcontroller, application specific integrated circuit, or other programmable logic device capable of manipulating and controlling memory elements and the communications subsystem. The operations may be performed by these elements operating under stored program control. The suitable programming of such devices will be within the ability of one of ordinary skill in the art, having regard to the description herein.

Although the foregoing embodiments describe the active band information 60 (FIG. 1) as being stored in the flash memory 24 (FIG. 1), those of ordinary skill in the art will appreciate that the active band information 60 may be stored in other memory elements, including the SIM 56 (FIG. 1) or RAM 26 (FIG. 1). The location or manner in which the active band information 60 is stored is not intended as a limitation of the present application.

Although the foregoing embodiments describe the RPLMN information as being stored in the SIM 56 (FIG. 1), those of ordinary skill in the art will appreciate that the RPLMN information may be stored in other memory elements, including the flash memory 24 (FIG. 1) or RAM 26 (FIG. 1). The location or manner in which the RPLMN information and, in particular, the MCC information, is stored is not intended as a limitation of the present application. Moreover, those of ordinary skill in the art will also appreciate that in some embodiments the country information may be stored other than in RPLMN information. Accordingly, it will be appreciated that the device may store and read country information in any suitable manner.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of efficient frequency band scanning of multiple supported bands to obtain service for a mobile device, wherein the mobile device includes a stored list of frequency bands identified as being active during a previous scan, the mobile device communicating on a current band, the method comprising the steps of:

scanning to identify which bands are active;

establishing a connection with a wireless network on one of the identified bands, wherein the one of the identified bands is a member of a first pair of frequencies in a first national network frequency plan;

storing a list of the bands identified as being active but on which the device did not establish the connection, wherein the list includes a candidate band that is a member of a second pair of frequencies in a second national network frequency plan and wherein the list excludes another band within the first national network frequency plan;

selecting the candidate band from the stored list of bands in response to a loss of coverage on the one of the identified bands; and scanning said candidate band to locate a wireless network and, if the wireless network is located, obtaining service on said candidate band, wherein scanning said candidate band occurs before scanning said another band.

2. The method claimed in claim 1, wherein said step of scanning said candidate band concludes that said candidate band is inactive, and further including steps of identifying another candidate band and scanning said another candidate band.

3. The method claimed in claim 2, wherein said another candidate band comprises a band included in the stored list of bands.

4. The method claimed in claim 2, wherein said another candidate band comprises said another band.

5. The method claimed in claim 2, wherein the mobile device is operable using a plurality of supported bands, and wherein said another candidate band is one of said plurality of supported bands and is not included in the stored list of bands and is not a member of the first national network frequency plan.

6. A mobile electronic device, comprising:

a communications subsystem for engaging in wireless communication with a wireless network, said communications subsystem being capable of communicating on at least two frequency bands wherein the communication subsystem is configured to scan the bands to identify which bands are active and establish a connection with the wireless network on one of the identified bands;

memory;

a processor connected to said memory and to said communications subsystem for controlling operation of said communications subsystem;

a list stored in said memory, wherein said list contains frequency bands identified as being active during said scan but on which the device did not establish the connection; and a network locator component for selecting a candidate band from said list in response to a loss of coverage on said one of the identified bands, scanning said candidate band to locate the wireless network and, if the wireless network is located, obtaining service on said candidate band, wherein said one of the identified bands is a member of a first pair of frequencies in a first national network frequency plan, and wherein said candidate band is selected from a second pair of frequencies in a second national network frequency plan, and wherein the list excludes another band within the first pair of frequencies in the first national network frequency plan, and wherein the network locator component is configured to scan said candidate band before scanning said another band based on the list.

7. The device claimed in claim 6, wherein, if said network locator component finds that said candidate band is inactive, said network locator component identifies another candidate band.

8. The device claimed in claim 7, wherein said another candidate band comprises a band included in said list.

9. The device claimed in claim 7, wherein said another candidate band comprises said another band.

10. The device claimed in claim 7, wherein said communication system is operable for engaging in wireless communications using a plurality of supported bands, and wherein said another candidate band comprises one of said plurality of support bands and is not included in said list and is not a member of the first national network frequency plan.

11. The method claimed in claim 1, wherein said first national network frequency plan comprises at least two likely co-existing frequency bands, and wherein said second national network frequency plan comprises at least two other likely co-existing frequency bands, and wherein said at least two likely co-existing frequency bands are mutually exclusive from said at least two other likely co-existing frequency bands.

12. The device claimed in claim 6, wherein said first national network frequency plan comprises at least two likely co-existing frequency bands, and wherein said second national network frequency plan comprises at least two other likely co-existing frequency bands, and wherein said at least two likely co-existing frequency bands are mutually exclusive from said at least two other likely co-existing frequency bands.

13. A method of efficient frequency band scanning of multiple supported bands to obtain service for a mobile device, the supported band including first bands from a first national network frequency plan and second bands from a second national network frequency plan, the first bands being different from the second bands, the method comprising the steps of:

scanning to identify which of the first bands and second bands are active;

storing a list of the bands identified as being active including a current band on which the device establishes a connection, the current band being a member of the first national network frequency plan, wherein the list excludes at least one band from the first national network frequency plan; and in response to a loss of coverage on the current band, scanning to seek active bands, wherein the scanning includes selecting a candidate band from the stored list of bands for scanning, the candidate band being a member of the second national network frequency plan, before scanning the at least one band from the first national network frequency plan.

14. The method claimed in claim 13, wherein the list excludes all bands that are members of the first national network frequency plan.

15. The method claimed in claim 13, wherein the list includes one of said first bands from the first national network frequency plan and excludes said at least one band from the first national network frequency plan, and wherein scanning to seek active bands includes selecting said one of the first bands, scanning said one of the first bands and determining that coverage is not available, and then selecting the candidate band wherein the candidate band is the member of the second national network frequency plan prior to scanning said at least one band.

16. The method claimed in claim 13, wherein scanning to identify which of the first bands and second bands are active includes performing a full scan at power on.

17. The method claimed in claim 13, wherein said scanning includes scanning all bands in the list until active service is found and, if active service is not found, scanning supported bands that were not included in the list.

18. The method claimed in claim 17, wherein if active service is not found on a band included in the list, then supported bands not included in the list are prioritized for scanning based on the last used mobile country code.

* * * * *